US011907217B2

(12) United States Patent
Bok et al.

(10) Patent No.: US 11,907,217 B2
(45) Date of Patent: Feb. 20, 2024

(54) DATABASE OBJECT VALIDATION FOR REUSING CAPTURED QUERY PLANS

(71) Applicant: SAP SE, Walldorf (DE)

(72) Inventors: Youngbin Bok, Seoul (KR); Won Jun Chang, Seoul (KR); Jaehyok Chong, Seoul (KR)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 17/826,007

(22) Filed: May 26, 2022

(65) Prior Publication Data

US 2023/0385276 A1 Nov. 30, 2023

(51) Int. Cl.
*G06F 16/2453* (2019.01)

(52) U.S. Cl.
CPC .............. *G06F 16/24542* (2019.01)

(58) Field of Classification Search
None
See application file for complete search history.

(56) References Cited

U.S. PATENT DOCUMENTS

| 5,734,887 | A * | 3/1998 | Kingberg | G06F 16/284 |
| 7,739,269 | B2 * | 6/2010 | Chaudhuri | G06F 16/24542 707/718 |
| 2004/0153454 | A1 * | 8/2004 | Aldrich | G06F 16/24524 |
| 2005/0065952 | A1 * | 3/2005 | Dettinger | G06F 16/258 |
| 2007/0143314 | A1 * | 6/2007 | Thomsen | G06F 16/21 |
| 2009/0100004 | A1 * | 4/2009 | Andrei | G06F 16/2453 |
| 2010/0306188 | A1 * | 12/2010 | Cunningham | G06F 16/24542 707/769 |
| 2013/0091122 | A1 * | 4/2013 | Salch | G06F 16/24542 707/718 |
| 2015/0339347 | A1 * | 11/2015 | Wiener | G06F 16/24542 707/718 |
| 2016/0364447 | A1 * | 12/2016 | Chen | G06F 16/2453 |
| 2017/0147639 | A1 * | 5/2017 | Lee | G06F 16/24539 |
| 2018/0189348 | A1 * | 7/2018 | Sirohi | G06F 16/24539 |
| 2021/0303571 | A1 | 9/2021 | Chang et al. | |
| 2021/0357407 | A1 | 11/2021 | Bok et al. | |

OTHER PUBLICATIONS

Optimizer and Statistics Collection Enhancements—Oracle 11G, https://www.wisdomjobs.com/e-university/oracle-11g-tutorial-282/optimizer-and-statislics-collection-enhancements-1828.html, printed Mar. 14, 2022, 30 pages.

(Continued)

*Primary Examiner* — Augustine K. Obisesan
(74) *Attorney, Agent, or Firm* — Klarquist Sparkman, LLP

(57) ABSTRACT

A computer implemented method can receive a request for a fallback query execution plan of a query in a database system. The query involves an object of the database system. The object is associated with a captured object. The method can evaluate whether the object and the captured object have the same logical structure. Responsive to an indication that the object and the captured object have the same logical structure, the method can reuse the fallback query execution plan to execute the query. The evaluating includes identifying a logical structure of the captured object stored in an object definition table, obtaining a current logical structure of the object, and comparing the logical structure of the captured object with the current logical structure of the object.

20 Claims, 9 Drawing Sheets

(56) References Cited

OTHER PUBLICATIONS

"SAP HANA Troubleshooting and Performance Analysis Guide," SQL Plan Stability, https://help.sap.com/docs/SAP_HANA_PLATFORM/bed8c14f9f024763b0777aa72b5436f6?locale=en-US&state=PRODUCTION&Version=2.0.05, printed Apr. 23, 2022, 6 pages.
David Wein, Adaptive Server Enterprise White Paper, "Understanding the Metadata Cache," Sybase Product Support Engineering, Sep. 2002, 64 pages.
What is Data Definition Language (DDL)?—Definition from Techopedia, https://www.techopedia.com/definition/1175/data-definition-language-ddl, 13 pages, printed Mar. 7, 2022.

* cited by examiner

| ID | DB_NAME | SCHEMA_NAME | OBJECT_NAME | OBJECT_TYPE | OID | VID | DEFINITION_ID |
|---|---|---|---|---|---|---|---|
| 1 | DB1 | SYSTEM | T1 | TABLE | 154364 | 1 | 1 |
| 2 | DB1 | SYSTEM | T1 | TABLE | 154999 | 2 | 2 |
| 3 | DB1 | SYSTEM | T1 | TABLE | 155600 | 1 | 2 |

310

| DEFINITION_ID | DEFINITION_VERSION | DEFINITION | IS_VALID | TIMESTAMP |
|---|---|---|---|---|
| 1 | 1 | Create column table t1 (a int) | True | 2022.01.01 21:30 |
| 2 | 1 | Create row table t1 (a double) | True | 2022.01.01 02:30:15 |

DATABASE OBJECT VALIDATION FOR REUSING CAPTURED QUERY PLANS

BACKGROUND

A query plan (also referred to as "query execution plan") is a sequence of steps that a database management system (DBMS) executes in order to complete a query. When a query is run for the first time in the DBMS, the query can be compiled by a query optimizer to generate a corresponding query plan, which can be stored in memory called "query plan cache," or simply "plan cache." Thus, when the same query is run again, the DBMS does not need to regenerate the query plan. Instead, it can reuse the cached query plan stored in the query plan cache, thereby improving efficiency of the DBMS.

Even for the same query, the query plan generated by the query optimizer can change over time, e.g., due to system upgrade to the database or other reasons. While a system upgrade often leads to performance improvement of query plans, performance regression of query plans can occur in certain circumstances. To mitigate potential performance regression of query plans, the query optimizer may attempt to reuse previously captured query plans that have good or acceptable performance, and such feature can be referred to as query plan stability. However, there are times when previously captured query plan cannot be reused. To ensure query plan stability, there remains a need for an improved technology for determining whether previously captured query plans can be reused.

BRIEF DESCRIPTION OF THE DRAWINGS

FIG. 3 depicts an object mapping table and an object definition table, according to one example.

DETAILED DESCRIPTION

Example 1—Overview of Query Plan Reusability

Figure 1:
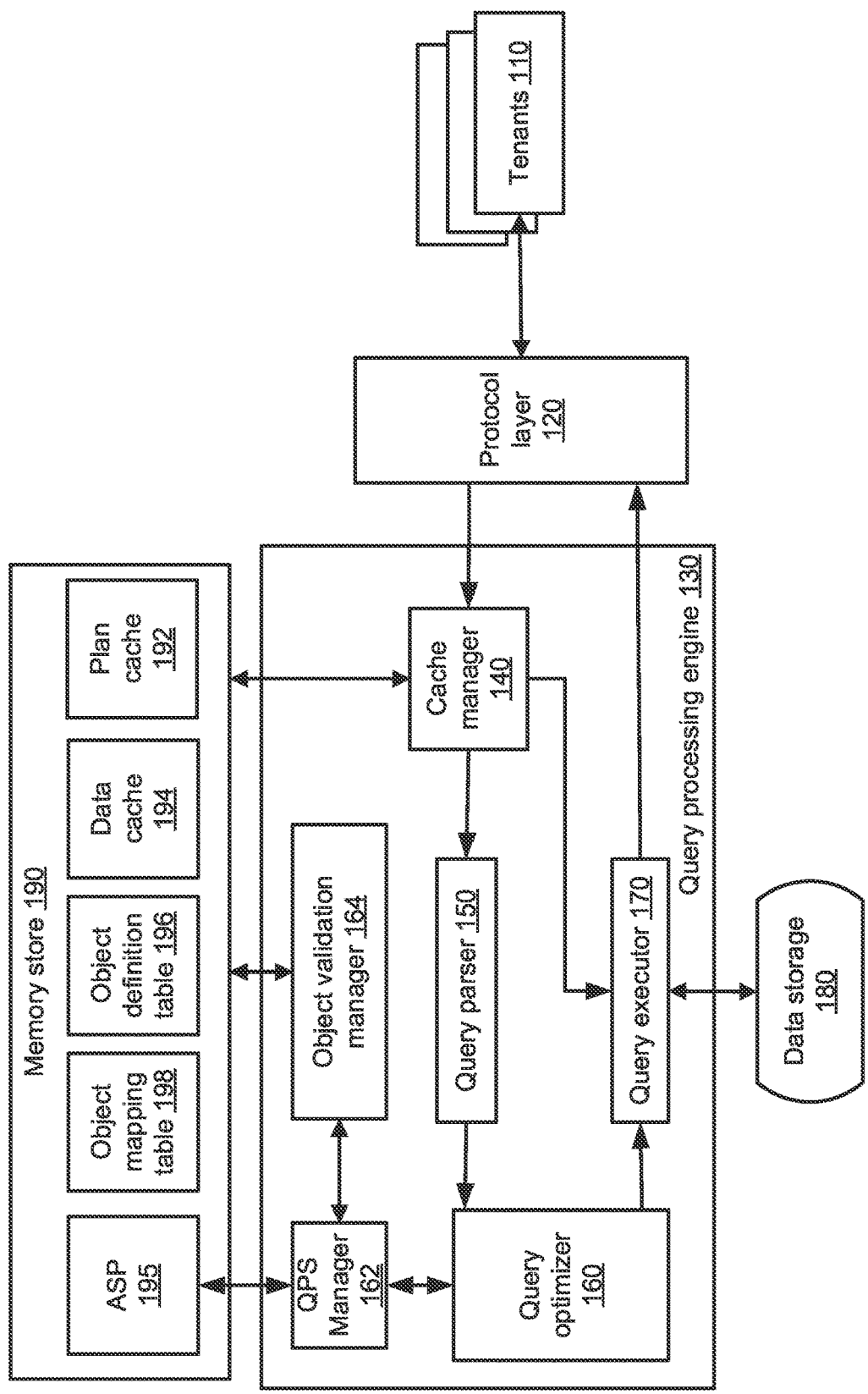
FIG. 1 is an overall block diagram of an example database management system supporting database object validation for reusing captured query plans.

Even for the same query, the query plan generated by the query optimizer can change over time for a number of reasons, such as a system upgrade to the database and/or the query optimizer, changes in actual data stored in the database, etc. For example, a database system upgrade can introduce new or change existing logical plan enumeration rules, introduce new or change physical execution algorithms, change query plan size and/or cost estimation logic, change query plan statistic calculation schemes, etc. Such a system upgrade can cause the query optimizer to generate different query plans for the same query.

Optimizing performance of query plans is important for the DBMS. Performance of a query plan can be described in terms of time (e.g., time required to execute the query plan) and/or burden on computing resources (e.g., processing power and/or memory expended to execute the query plan). While a system upgrade often leads to performance improvement of query plans, performance regression of query plans can occur in certain circumstances. Performance regression of query plans can also occur due to data change in the database.

To mitigate potential performance regression of query plans, a query plan stability (QPS) feature can be implemented in the DBMS, such as the SQL Plan Stability implemented in SAP HANA, provided by SAP SE of Walldorf, Germany. The QPS feature offers the option to preserve a query's execution plan by capturing a logical representation of the query plan and reusing it if required to regenerate the original plan so as to retain the original performance.

However, in certain circumstances, the current database system may not be able to reuse or execute the previously captured query plans. For example, one approach for implementing the QPS feature is based on checking metadata of objects (e.g., tables, views, etc.) involved in a query. Specifically, when a query plan is captured, metadata of objects involved in the query can be saved. The metadata of an object can include a unique object identifier (OID) and a version identifier (VID). As described herein, OID and VID are generic terms and refer to any parameters that can uniquely identify an object and a version of the object, respectively. When the captured query plan is about to be reused, current metadata of the object can be retrieved from the database and compared to the saved metadata of the object. The object is validated if the current metadata and the saved metadata have the same OID and VID. If all objects involved in the query are validated, the captured query plan can be reused. Otherwise, the captured query plan can be deemed not reusable because change in the metadata may indicate structural changes of certain objects involved in the query. Blindly reusing the captured query plan may yield erroneous query results.

However, the metadata-based approach described above has certain limitations. Metadata of an object can change even when such change has no actual effect on execution of the query plan because the object's logical structure remains the same.

As described herein, the logical structure of an object includes object parameters that can affect validity or reusability of the query plan involving the object. In other words, if any of the object parameters defining the logical structure of the object changes, the query plan involving the object is deemed to be invalid and cannot be reused. For example, the logical structure of a database table can comprise number of attributes, names of the attributes, data types of the attributes, and nullability uniqueness of values. Change in any one of these object parameters can change the logical representation of the query plan and cause the query plan non-reusable.

In certain circumstances, the VID of a database table object can be changed due to execution of a "truncate table" command. The OID can also be different for the same object. For example, assume the following three commands are executed sequentially: (1) "create table t1 (a int)"; (2) "drop table t1"; and (3) "create table t1 (a int)". This can occur during a database upgrade or application upgrade, when a user may drop and then recreate certain schemas and/or tables. In this example, the third command generates exactly the same table "t1" as the first command, but the third command can generate a different OID for the table "t1" than the first command Additionally, the OID for the same object can also differ between a test database system and a production database system. In the above circumstances, the metadata-based approach would indicate that the captured query plan cannot be reused because its metadata might have a different OID and/or VID, despite the fact that reusing the captured query plan would lead to the same query results as, and better performance than, the current query execution plan. In other words, an opportunity to mitigate performance regression of the query plan can be wasted.

Accordingly, there remains a need for an improved system and method for more objective and accurate assessment of query plan reusability.

Example 2—Example DBMS Supporting Object Validation for Reusing Captured Query Plans FIG. 1 shows an overall block diagram of an example database management system 100 which can accurately and efficiently assess query plan reusability through an improved object validation technology.

The database management system 100 can be configured to support multi-tenancy. As shown, the database management system 100 includes a query processing engine 130 and a protocol layer 120 which serves as an interface between one or more tenants 110 and the query processing engine 130. For example, the protocol layer 120 can implement a server name indication protocol by which the tenants 110 can connect to the query processing engine 130. Each tenant 110 represents a group of users who can access a tenant-specific database managed by the database management system 100.

The query processing engine 130 can include a cache manager 140, a query parser 150, a query optimizer 160, and a query executor 170. The cache manager 140 can access a plan cache 192 in a memory store 190. The plan cache 192 represents a fast-access memory space configured to store previously compiled query plans. In certain cases, the memory store 190 can also include a data cache 194 configured to keep recent or often-used data in its cache memory which is faster or computationally cheaper to access than normal data storage.

In certain examples, the memory store 190 can include one or more object mapping table 198 and one or more object definition table 196. In certain examples, each tenant 110 can be associated with one object mapping table 198 and a corresponding object definition table 196. As described more fully below, the object definition tables 196 can store logical structures of captured objects that are involved in previously captured queries, and the object mapping tables 198 can store relevant attributes of those captured objects and references to selected logical structures of the captured objects stored in the object definition tables 196. In certain examples, the object mapping tables 198 and/or the object definition tables 196 can also be configured as cache memory. In other examples, the object mapping tables 198 and/or the object definition tables 196 can be stored in a persistence disk, and loaded into a cache memory if needed.

An incoming query sent from a tenant 110 can be evaluated by the cache manager 140 to determine if the query has a corresponding (compiled) query execution plan stored in the plan cache 192.

If the cache manager 140 finds no query execution plan in the plan cache 192 that corresponds to the income query, the incoming query can be analyzed by the query parser 150, which can check if the query contains syntactic and/or semantic errors. After verifying that the incoming query is a valid transactional SQL statement that changes data (e.g., SELECT, INSERT, UPDATE, DELETE, MERGE, etc.), the query parser 150 can generate one or more execution trees in which the query can be run. An execution tree can be used by the query optimizer 160 to generate a corresponding query execution plan, which determines how the query will be executed. The query optimizer 160 can be configured to determine that, among a plurality of query execution plans that are generated based on respective execution trees, which query execution plan is the most optimal or efficient one (e.g., the one that is cheapest in terms of query cost calculated based on CPU usage, memory usage, etc.).

The determined (i.e., most optimal) query execution plan can then be sent to the query executor 170 for execution. The query executor 170 can communicate with a data storage or memory space 180 and execute operators in the query execution plan determined by the query optimizer 170. Data retrieved from the data storage or memory space 180 can be returned to the tenant 110 via the protocol layer 120.

As described herein, query compilation refers to the process of converting an incoming query to the optimal query execution plan (e.g., checking syntactic and/or semantic errors, generating execution trees, and determining optimal query execution plan), as described above. Depending on the complexity of the query (e.g., the number of joined tables, etc.) and the query optimization algorithm, query compilation time can be long (e.g., tens of seconds or more). Thus, to improve operational efficiency, the compiled query execution plan (i.e., the determined most optimal query execution plan) corresponding to the incoming query can be stored in the plan cache 192 so that it can be quickly retrieved and reused if the same query is submitted again in the future.

For example, if the cache manager 140 determines that the incoming query has a corresponding query execution plan in the plan cache 192, that query execution plan can be fetched directly from the plan cache 192 and forwarded to the query executor 170 for execution. Thus, in this scenario, operations by the query parser 150 and query optimizer 160 can be bypassed. In other words, the incoming query does not need to be recompiled because its previously compiled query execution plan is available in the plan cache 192.

As noted above, the plan cache 192 can store compiled query execution plans. For an incoming query, the cache manager 140 checks if it has a compiled query execution plan stored in the plan cache 192. If yes, then this cached query execution plan can be reused. This can improve efficiency because it eliminates the time of compiling the query (i.e., regenerating the query execution plan). On the other hand, if the query has no compiled query execution plan stored in the plan cache 192, the query has to be compiled. The compiled query can then be stored in the plan cache 192 so that when the same query occurs gain in the future, fast access to its cached query execution plan is feasible. In other words, the plan cache 192 can improve performance by keeping recent or often-used query execution plans in its cache memory which is faster or computationally cheaper to access than normal memory stores.

If the incoming query is new (i.e., a first-time query that has not been submitted before), this new query has no corresponding query execution plan in the plan cache 192 and it must be compiled for the first time. On the other hand, if the incoming query is old (i.e., the same query has been submitted at least once before), whether or not there is a corresponding compiled query execution plan in the plan cache 192 can depend on the size of the plan cache 192 and a plan eviction policy adopted by the cache manager 140.

The plan cache 192 has a limited size. Thus, it may not be able store all compiled query execution plans. When the plan cache 192 approaches its full capacity, certain query execution plans may have to be evicted (i.e., removed) from the plan cache 192 to make room for new ones according to a predefined plan eviction policy implemented by the cache manager 140. For example, the cache manager 140 can implement a random plan eviction policy which evicts query execution plans from the plan cache 192 in a random manner. In another example, the cache manager 140 can implement the least recently used (LRU) plan eviction policy which removes the least recently used query execution plans first from the plan cache 192. In yet another example, the least frequently used (LFU) plan eviction policy can be used which first evicts the execution policies that are used least often. Many other plan eviction policies can also be used by the cache manager 140.

As described above, performance regression of query execution plans can occur, e.g., due to a system upgrade and/or data change of the database management system 100. To mitigate potential performance regression of query plans, the query plan optimizer 160 can communicate with a query plan stability (QPS) manager 162, which is configured to capture selected query plans and reuse them if necessary to regenerate the original query plans so as to retain the original performance. The captured query plans can be stored in an abstract query plan (ASP) store 195. In the depicted example, the ASP store 195 resides in the memory store 190. In other examples, the ASP store 195 can be stored in a persistence layer, and loaded into the memory if needed. Example ASP stores and methods of capturing query plans are described in U.S. Patent Publications Nos. 2021/0303571 and 2021/0357407, both of which are incorporated herein by reference in their entireties.

In certain examples, the query processing engine 130 can further include an object validation manager 164 in communication with the QPS manager 162. The object validation manager 164 can be configured to determine whether a previously captured query plan stored in the ASP store 195 can be reused. Specifically, the object validation manager 164 can be configured to assess reusability of objects involved in a query execution plan by interacting with the object mapping tables 198 and the object definition tables 196, as described more fully below. Although shown as separate components outside the query optimizer 160 in FIG. 1, the QPS manager 162 and/or the object validation manager 164 can also be configured as integral parts of the query optimizer 160, according to certain examples.

In practice, the systems shown herein, such as system 100, can vary in complexity, with additional functionality, more complex components, and the like. For example, there can be additional functionality within the query processing engine 130. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the objects, logical structures of the objects, the object mapping tables, the object definition tables, and the like can be stored in one or more computer-readable storage media or computer-readable storage devices. The technologies described herein can be generic to the specifics of operating systems or hardware and can be applied in any variety of environments to take advantage of the described features.

Figure 2:
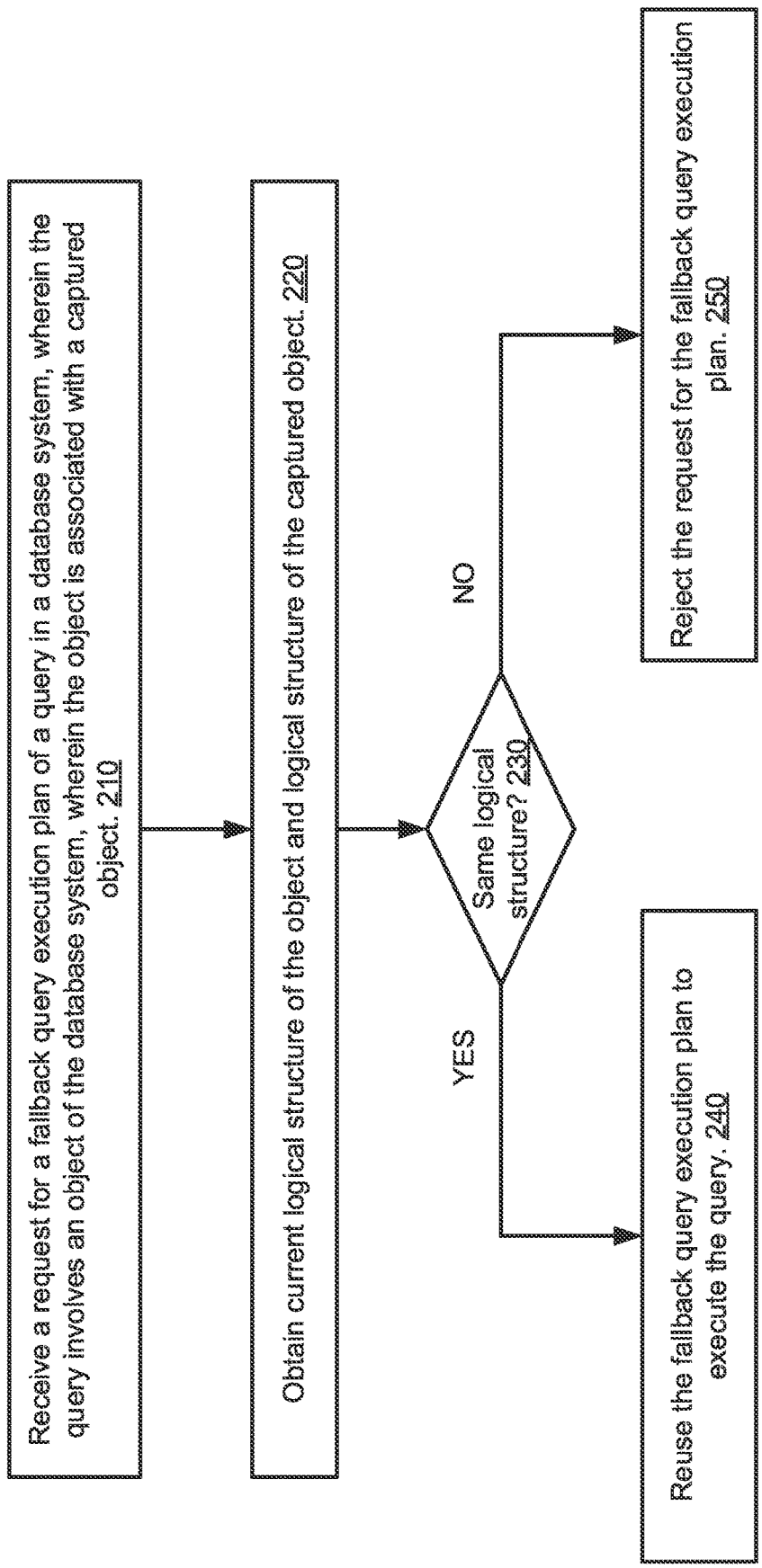
FIG. 2 is a flowchart illustrating an example overall method of implementing database object validation for reusing captured query plans.

Example 3—Example Overall Method of Implementing Object Validation for Reusing Captured Query Plans FIG. 2 is a flowchart illustrating an overall method 200 of implementing object validation for reusing captured (or fallback) query execution plans, and can be performed, for example, by the system of FIG. 1. In one specific example, the method 200 can be implemented by the object validation manager 164 depicted in FIG. 1.

At 210, a request for a fallback query execution plan of a query in a database system (e.g., 100) can be received, e.g., by the object validation manager 164. The fallback query execution plan can be previously captured and stored in the ASP store 195. The query can involve an object of the database system. The object can be associated with a captured object previously generated when capturing the fallback query execution plan.

At 220, the object validation manager 164 can obtain a current logical structure of the object and a logical structure of the captured object. To obtain the logical structure of the captured object, the method 200 can search an object mapping table (e.g., 198) and a corresponding object definition table (e.g., 196), as described further below.

At 230, the object validation manager 164 can compare the logical structure of the captured object with the current logical structure of the object.

If it is determined that the logical structure of the captured object is the same as the current logical structure of the object, the object validation manager 164 can generate an indication that the object and the captured object have the same logical structure, based on which the system can (e.g., via the QPS manager 162) reuse the fallback query execution plan to execute the query at 240.

On the other hand, if it is determined that the logical structure of the captured object is different from the current logical structure of the object, the system can (e.g., via the QPS manager 162) to reject the request for the fallback query execution plan at 250. Under such circumstances, the current query plan will be executed.

In some circumstances, the query can involve a plurality of objects, and each object can be associated with a corresponding captured object. The method 200 can evaluate the logical structures of each object and its corresponding captured object. Responsive to the determination that the logical structures of each object and its corresponding captured object are the same, the query can be reused. Otherwise, the request to reuse the fallback query execution plan is rejected.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4—Example Object Mapping Table and Object Definition Table

When capturing a query execution plan of a query (e.g., by the QPS manager 162), objects involved in the query can be captured. Specifically, the logical structures of the captured objects can be stored in an object definition table (e.g., 196), and attributes of the objects can be stored as records in an object mapping table (e.g., 198). The object mapping table can also include references that link the records in the object mapping table to corresponding logical structures of the captured objects stored in the object definition table. Later, when determining whether a captured query execution plan can be reused, the logical structures of the captured objects involved in the query can be retrieved from the object definition table (via searching the object mapping table) and compared with current logical structures of the objects, as described above in method 200.

FIG. 3 depicts an object mapping table 310 and an object definition table 320, according to one example. Similar to 198 and 196 depicted in FIG. 1, the object mapping table 310 and object definition table 320 can be stored in a memory store (e.g., 190) and accessible by an object validation manager (e.g., 164).

In this example, the object mapping table 310 includes three records 312, 314, and 316 corresponding to three captured objects. Each record has a plurality of attributes of the corresponding captured object, such as database name (DB_NAME), schema name (SCHEMA_NAME), object name (OBJECT_NAME), object type (OBJECT_TYPE), OID, and VID. Each record also has a unique identifier (ID) and a reference (denoted as DEFINITION_ID). In certain examples, additional attributes of the captured objects can also be included in the object mapping table 310. In certain examples, certain attributes (e.g., DB_NAME and/or SCHEMA_NAME) may be omitted if such attributes are fixed.

A database system can include a plurality of databases with different schemas, and each database can include a number of objects with different object types (e.g., tables, views, etc.). In many cases, the combination of four attributes, namely DB_NAME, SCHEMA_NAME, OBJECT_NAME, and OBJECT_TYPE, can uniquely identify an object in DBMS. For example, the three records 312, 314, and 316 represent the same object (OBJECT_NAME=T1), which is a table (OBJECT_TYPE=TABLE) stored in a system database DB1 (DB_NAME=DB1, SCHEMA_NAME=SYSTEM).

However, the same object can change over time. As one example, an object can be altered to have a different logical structure (e.g., adding or removing an attribute, etc.). As another example, an object can be dropped and then recreated. As a result, the same object can have different OID and/or VID. In the depicted example, the pair of (OID, VID) for the same object identified in records 312, 314, and 316 are (1, 1), (2, 2) and (1, 2), respectively.

The object definition table 320 has two rows or records 322 and 324, each row including a unique definition identifier (also denoted as DEFINITION_ID), a definition version (DEFINITION_VERSION), a definition of logical structure (DEFINITION), a validity status (IS_VALID), and a timestamp (TIMESTAMP). In certain examples, the object definition table 320 can have additional columns pertaining to definitions of logical structures.

As described herein, the logical structure of an object can be represented by a definition statement (DEFINITION) of the object. In certain examples, the definition statement can be written in Data Definition Language (DDL), which is a SQL syntax for creating and/or modifying database objects (e.g., tables). Example DDL commands include CREATE, ALTER, DROP, TRUNCATE, etc. Note that while some DDL commands (e.g., CREATE, etc.) may change the logical structure of an existing table, some DDL commands (e.g., TRUNCATE, etc.) may not change the logical structure of an existing table. In other examples, the definition statement of an object can be represented by other formats/syntaxes so long as the logical structure of the object (e.g., attributes, data types, etc.) can be captured. In the depicted example, the logical structures of captured objects are expressed as DDL statements which are readable strings, e.g., "Create column table t1 (a int)" and "Create row table t1 (a double)." In these examples, the Create statements (in string format) can hold or define the logical structures of the captured objects. Alternatively, the logical structures of captured objects can be expressed in other formats, e.g., the DDL statements can be reversibly converted into binary values, hash values, or the like. In one particular example, each DDL statement can be converted into a 128-bit hash value, which can be stored more efficiently than the Create statement strings. Comparison of the DDL statements based on hash values can also be more efficient (e.g., faster) than comparison of DDL strings.

In certain scenarios, the definition statements used in a database system can evolve over time. For example, the DDL statements can have different versions as a result of bug fix, introduction of new features, etc. To illustrate, let us assume there is a database system where all database tables previously created are row tables. Thus, according to the old version, the DDL statement "Create table T1 (a int)" will create a row table T1 comprising an attribute "a" with an integer data type. Let us further assume the database system is now updated to allow the creation of columnar tables. To support this new feature, a new version of DDL statement is introduced. According to the new version, the DDL statement creating the same row table T1 will be "Create row table T1 (a int)" (to differentiate from another DDL statement to create a column table, e.g., "Create column table T1 (a int)"). Thus, the definition statements for creating the same object can differ simply due to different versions of the definition statements.

As described herein, when capturing an object, the version of the definition statement (DEFINITION_VERSION), as well as the time of capture (TIMESTAMP), can be stored along with the logical structure of the object (e.g., DEFINITION) in the object definition table 320. The validity status (IS_VALID) for each captured logical structure can be initialized to True (indicating the captured logical structure is valid). As described further below, the validity status can be changed to False when the captured logical structure is invalidated.

The object mapping table 310 and the object definition table 320 can be linked together via the matching reference and definition identifier (DEFINITION_ID). For example, the record 312 can be linked to the first row 322 because they share the same DEFINITION_ID=1; both records 314 and 316 are linked to the second row 324 because they share the same DEFINITION_ID=2, etc.

A captured object is not new if a matching record in the object mapping table 310 have the same attributes as the object (e.g., DB_NAME, SCHEMA_NAME, OBJECT_NAME, OBJECT_TYPE, OID, and VID). In such circumstances, no change is necessary for the object mapping table 310 or the object definition table 320. The logical structure of the captured object can be retrieved from the object definition table 320 through a reference (e.g., DEFINITION_ID) of the matching record.

When a new object is captured, attributes of the object (e.g., DB_NAME, SCHEMA_NAME, OBJECT_NAME, OBJECT_TYPE, OID, and VID) can be stored in a new record in the object mapping table 310. If the newly captured object has a new logical structure (e.g., DEFINITION of the newly captured object is not found in the object definition table 320), such new logical structure can be stored in a new row or record in the object definition table 320. A link can be established between the new record in the object mapping table 310 and the new logical structure stored in the object definition table 320 via a corresponding reference (e.g., DEFINITION_ID). On the other hand, if the newly captured object has an old logical structure already existing in the object definition table 320 (e.g., DEFINITION of the newly captured object is found in the object definition table 320), a reference can be added to the new record in the object mapping table 310 that points to the old logical structure stored in the object definition table 320.

Example 5—Example Method of Capturing Logical Structure of Query Plan Objects

Figure 4:
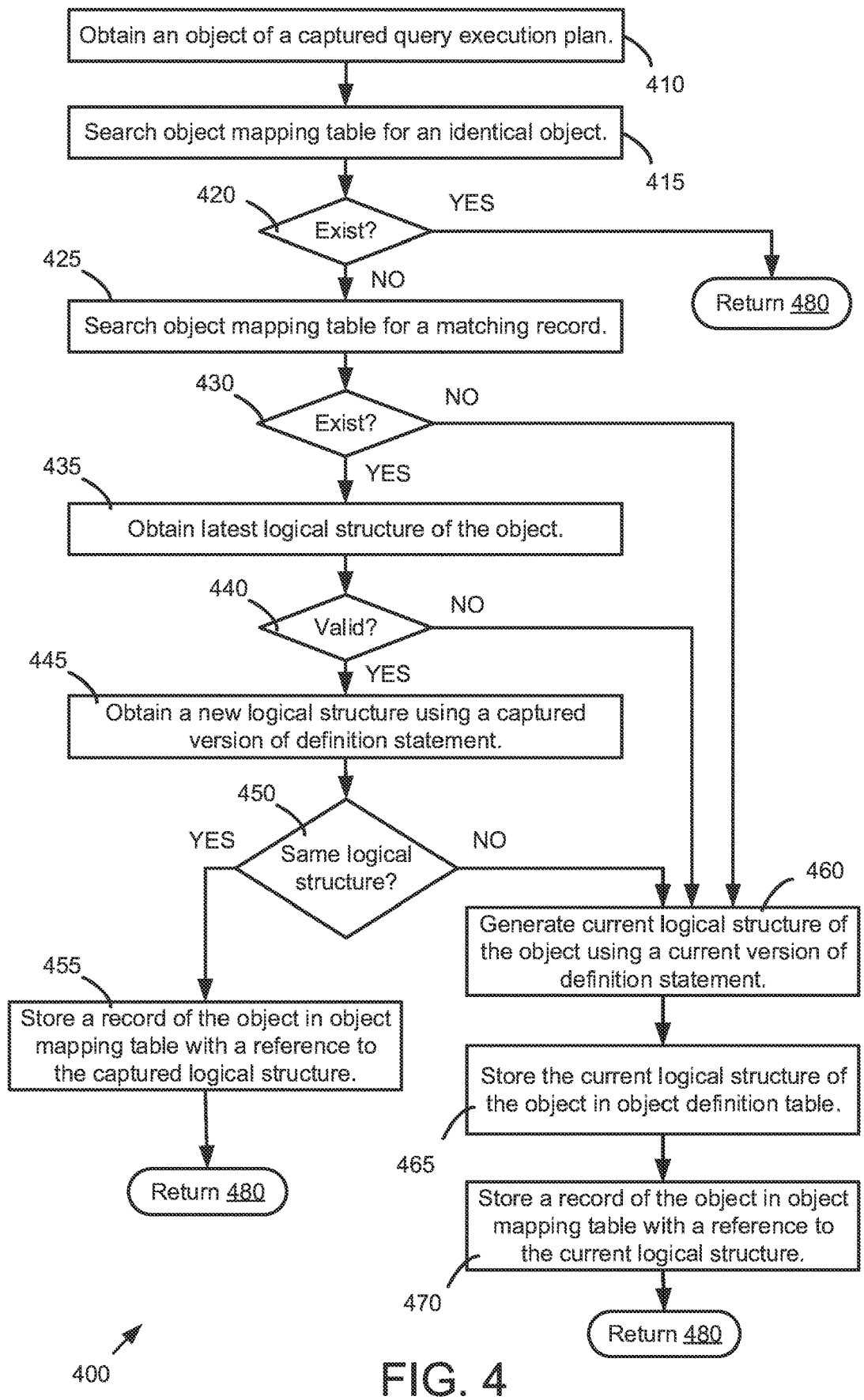
FIG. 4 is a flowchart illustrating an example method of capturing a logical structure of an object involved in a query plan.

FIG. 4 is a flowchart illustrating an example method 400 of capturing a logical structure of an object involved in a query execution plan. In one example, the method 400 can be implemented by the object validation manager 164 depicted in FIG. 1.

At 410, the method 400 can obtain an object of a captured query execution plan. For example, when a QPS manager (e.g., 162) captures a query execution plan, objects involved in the query can be identified. Related metadata of each object (e.g., DB_NAME, SCHEMA_NAME, OBJECT_NAME, OBJECT_TYPE, OID, VID, etc.) can be obtained by the QPS manager and passed to the object validation manager.

At 415, the method 400 can search an object mapping table (e.g., 198 or 310) for an identical object. As described herein, an identical object refers to a record in the object mapping table that has the same attributes (e.g., DB_NAME, SCHEMA_NAME, OBJECT_NAME, OBJECT_TYPE, OID, and VID) as the object.

At 420, a condition check can be performed. Responsive to finding a record in the object mapping table that is identical to the object (e.g., with the same DB_NAME, SCHEMA_NAME, OBJECT_NAME, OBJECT_TYPE, OID, and VID), the method 400 can return at 480, without any change to the object mapping table. As an example, if the attributes of the object are (DB_NAME=DB1, SCHEMA_NAME=SYSTE, OBJECT_NAME=T1, OBJECT_TYPE=TABLE, OID=155600, VID=2), then searching the object mapping table 310 can find an identical record 316.

On the other hand, responsive to not finding an identical object, the method 400 can proceed to 425 to find a matching record in the object mapping table. As described herein, a matching record refers to a record in the object mapping table that refers to the same object which has changed since a previous capture of the object. According to certain examples, a record in the object mapping table can be deemed as a matching record if the record contains the same DB_NAME, SCHEMA_NAME, OBJECT_NAME, and OBJECT_TYPE as the object (because the combination of these four attributes can uniquely identify the object), but may have different OID and/or VID than the object, thus indicating the object has a structure and/or version change since its last capture.

At 430, another condition check can be performed. Responsive to not finding a matching record, the method 400 can proceed to 460. This scenario indicates the object is new (i.e., the object has not been previous captured). Accordingly, the method 400 can generate a current logical structure of the object based on a definition statement (e.g., DDL statement) of object, using a current version of the definition statement.

Then at 465, the method 400 can store the current logical structure of the object in a corresponding object definition table (e.g., 196 or 312). The version of the definition statement (DEFINITION_VERSION), the current timestamp, and a unique definition identifier (DEFINITION_ID) can also be stored in the object definition table along with the current logical structure of the object.

Then at 470, the method 400 can store a new record in the object mapping table. The new record includes attributes of the object, including DB_NAME, SCHEMA_NAME, OBJECT_NAME, OBJECT_TYPE, OID, and VID, etc. In addition, the new record can include a reference (e.g., DEFINITION_ID) that matches the definition identifier of the current logical structure stored in the object definition table.

To illustrate, assume both the object mapping table 310 and the object definition table 320 are empty (e.g., before capturing any object). A table t1 is created based on the DDL statement "Create column table t1 (a int)." Then a query plan for a query involving table t1 is captured. In this case, the query related object (table t1) has no matching record in the object mapping table 310. As a result, a new row or record 322 including the logical structure of the object (e.g., the DDL statement "Create column table t1 (a int)") can be added to the object definition table 320. In addition, a new record 312 including attributes of the object and a reference to the logical structure can be added to the object mapping table 310.

After storing the current logical structure in the object definition table at 465 and storing the new record in the object mapping table at 470, the method 400 can return at 480.

If, however, the condition check at 430 finds one or more matching records, the method 400 can proceed to 435 to obtain the latest (or most recent) logical structure of the object stored in the object definition table. This latest logical structure of the object obtained from the object definition table can also be referred to as a "captured logical structure" of the object.

For example, the object matching table 310 includes three matching records 312, 314, 316 for the same object (table t1) because they share the same DB_NAME, SCHEMA_N-

AME, OBJECT_NAME, and OBJECT_TYPE. These three matching records refer to two different rows or records 322, 324 in the object definition table 320, which contain two logical structures represented by two different DDL statements. As described herein, the latest logical structure of the object obtained at 435 refers to the logical structure having the latest timestamp. Thus, in this example, the latest logical structure of the object is represented by the DDL statement "Create row table t1 (a double)."

Then, the validity of the captured logical structure (e.g., the IS_VALID status) of the object can be checked at 440. If, for whatever reason, the captured logical structure of the object is invalid, the method 400 can proceed to 460 and continue through 465, 470, and 480.

If the captured logical structure of the object is valid, the method 400 can proceed to 445 to obtain a new logical structure of the object using a captured version of the definition statement. For example, if the captured logical structure of the object is found in row 324 of the object definition table 320, the captured version of the definition statement can also be found in that row, e.g., in this example, DEFINITION_VERSION=1. Thus, a new logical structure of the object can be generated based on the definition statement using version 1 of the definition statement.

Then at 450, the captured logical structure of the object can be compared with the new logical structure of the object. For example, a string comparison can be made if both the captured logical structure and the new logical structure are represented by DDL statements.

Responsive to a determination that the captured logical structure of the object is different from the new logical structure of the object, the method 400 can proceed to 460 and continue through 465, 470, and 480. This represents a scenario where the logical structure of the object has changed since the latest capture of the object. Thus, the logical structure of the object needs to be updated in the object definition table.

On the other hand, responsive to a determination that the captured logical structure of the object is the same as the new logical structure of the object, at 455, the method 400 can store a new record of the object in the object mapping table. The new record can include attributes of the object and a reference to the captured logical structure of the object stored in the object definition table. The method 400 can return at 480 afterwards. This represents a scenario where the captured logical structure of the object is still applicable to the object despite the object has a changed OID and/or VID. Thus, the new record added to the object mapping table can still refer to the previously captured logical structure of the object stored in the object definition table.

Figure 5:
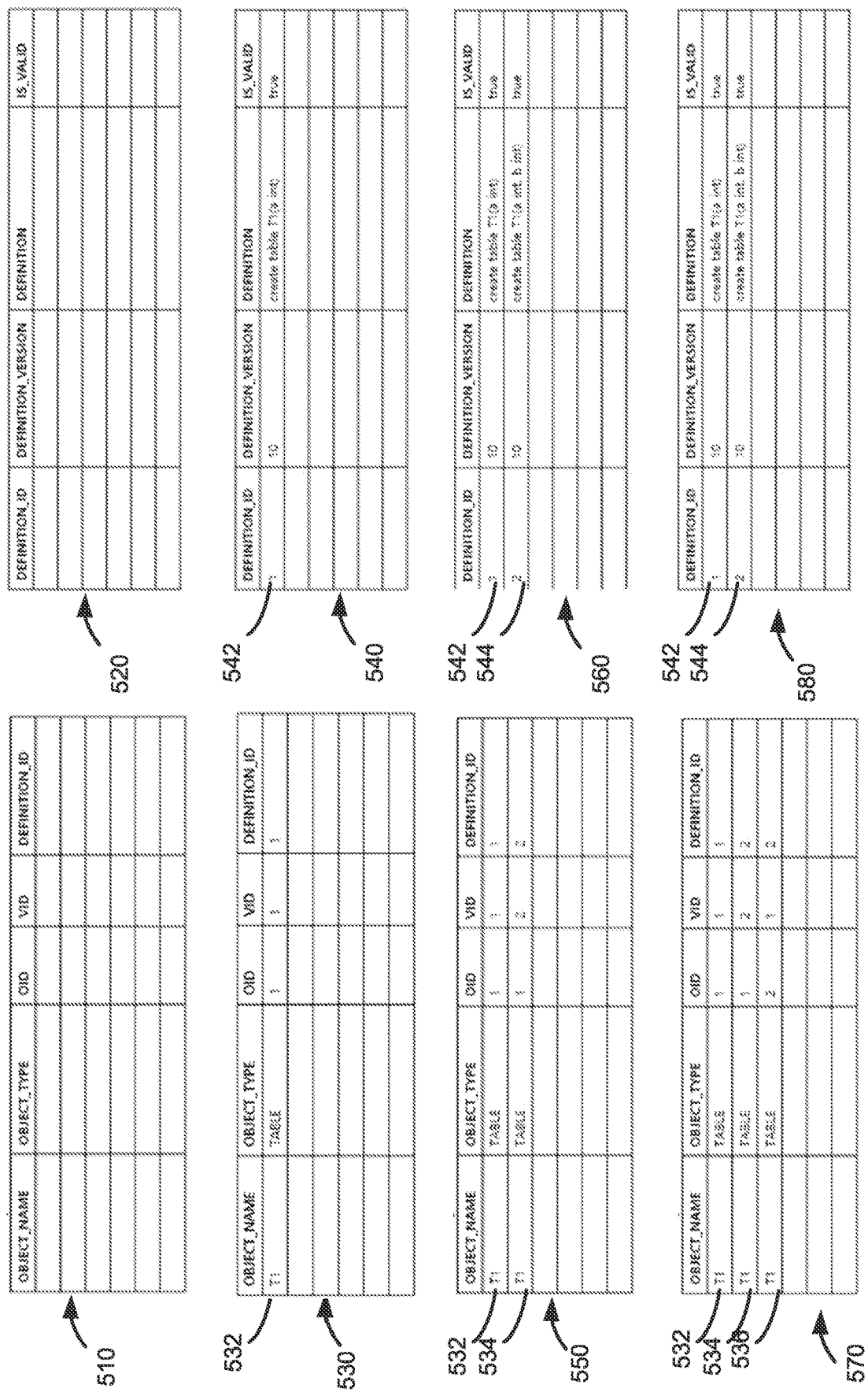
FIG. 5 depicts example content changes in an object mapping table and an object definition table in several use cases of capturing query plans.

Example 6—Example Use Cases Illustrating Method of Capturing Logical Structures of Query Plan Objects Four use cases are described herein with reference to FIG. 5 to further illustrate the method 400 of capturing logical structures of objects involved in a query. In FIGS. 5, 510, 530, 550, and 570 represent an object mapping table at different stages corresponding to the use cases, while 520, 540, 560, and 580 represent the related object definition table at different stages corresponding to the use cases. For simplicity, certain attributes (e.g., DB_NAME and SCHEMA_NAME) in the object mapping tables are omitted (e.g., assuming the objects are in the same database and share the same schema), and some columns (e.g., TIMESTAMP) are also omitted from the object definition tables.

In a first use case, the query plan compiled for a first query "SELECT 1 from T1" is captured by a user. The object related to this query is Table T1, which has an OID=1 and VID=1. The initial object mapping table 510 and object definition table 520 are empty.

Since the object mapping table 510 does not contain any record, the method 400 will find neither an identical object nor a matching object, thus will proceed directly to 460 and continue through 465, 470, and 480. In this example, the current logical structure of the object can be generated using a current version of the definition statement (DEFINITION_VERSION=10), which yields a DDL statement "create table T1(a int)." This DDL statement can be saved in the first row 542 of the object definition table (now becomes 540), along with DEFINITION_VERSION (10), an assigned DEFINITION_ID (1), and a validity status (IS_VALID=true). The stored DEFINITION_VERSION becomes the captured version of the definition statement for Table T1. A new record 532 can be added to the object mapping table (now becomes 530), comprising the object name (T1), object type (TABLE), OID (1), VID (1), and a reference (DEFINITION_ID=1) to the first row 542 of the object definition table 540.

In a second use case, a user changed the structure of Table T1 by adding a new column with the following DDL statement: "ALTER table T1 add column (b int)." Thereafter, the query plan compiled for a second query "SELECT 2 from T1" is captured. The object related to this query is still Table T1. Although the OID of Table T1 remains the same (i.e., 1), the VID of Table T1 is changed to 2.

Because the change of VID, no identical object can be found in the object mapping table 530. However, because the record 532 contains the same OBJECT_NAME and OBJECT_TYPE, a matching record is found in the object mapping table 530. Through the reference (DEFINITION_ID=1), the captured logical structure of Table T1 can be obtained, which is represented by the DDL statement "create table T1(a int)" and is deemed to be valid. Thus, the method 400 will proceed to 445 to obtain a new logical structure of the object using the captured version (DEFINITION_VERSION=10) of the definition statement. Because the definition of Table T1 was changed by the ALTER command, the obtained new logical structure can be represented by the following DDL statement "create table T1(a int, b int)." Thus, comparison at 450 will find the captured logical structure of Table T1 is different from the new logical structure of Table T1. Accordingly, the method 400 will proceed to 460 and continue through 465, 470, and 480.

Specifically, the current logical structure of the object can be generated using the current version of the definition statement (assuming DEFINITION_VERSION is still 10 in this example), which yields a DDL statement "create table T1(a int, b int)." This DDL statement can be saved in the second row 544 of the object definition table (now becomes 560), along with DEFINITION_VERSION (10), an assigned DEFINITION_ID (2), and a validity status (IS_VALID=true). A new record 534 is added to the object mapping table (now becomes 550), comprising the object name (T1), object type (TABLE), OID (1), VID (2), and a reference (DEFINITION_ID=2) to the second row 544 of the object definition table 560.

In a third use case, the query plan compiled for a third query "SELECT 3 from T1" is captured. The object related to this query is still Table T1. Since there has been no change to Table T1 since the previous capture, the OID and VID of Table T1 remains unchanged. Thus, searching the object mapping table 550 can find the second record 534 contains the identical object. As a result, no change to the object mapping table 550 or the object definition table 560 is necessary.

In a fourth use case, a user dropped Table T1, then recreated Table T1 via the following DDL statement "CREATE table T1 (a int, b int)." Thereafter, the query plan compiled for a fourth query "SELECT 4 from T1" is captured. The object related to this query is still Table T1, but the OID of Table T1 is changed to 2, and the VID of Table T1 becomes 1.

Due to the change of OID and VID, no identical object can be found in the object mapping table 550. However, two matching records 532 and 534 are found in the object mapping table 550 because both records contain the same OBJECT_NAME and OBJECT_TYPE. Through respective references, two logical structures of Table T1 can be identified in rows 542 and 544 of the object definition table 560. Since the logical structure in row 544 is the latest created one (e.g., based on timestamp), the captured logical structure of Table T1 can be represented by the DDL statement "create table T1(a int, b int)," which is deemed to be valid. Thus, the method 400 will proceed to 445 to obtain a new logical structure of the object using the captured version (DEFINITION_VERSION=10) of the definition statement, which yields an identical DDL statement "create table T1(a int, b int)." Thus, comparison at 450 will find the captured logical structure of Table T1 is the same as the new logical structure of Table T1. Accordingly, the method 400 will proceed to 455 to add a new record 536 to the object mapping table (now becomes 570). Notably, the object definition table 580 remains the same as 560 (i.e., no new logical structure is added therein). The new record 536 includes the object name (T1), object type (TABLE), OID (2), VID (1), and a reference (DEFINITION_ID=2) to the second row 544 (containing the captured logical structure) of the object definition table 580.

Example 7—Example Method of Assessing Reusability of Captured Objects

In some cases, a query can involve a plurality of objects. To evaluate whether a captured query plan (or fallback query execution plan) can be reused for this query, two preliminary checks can be performed. First, the number of objects involved in the captured query plan is compared to the number of objects involved in the query. If the counts are different, then the captured query plan is deemed to involve a different set of objects, thus the captured query plan cannot be reused.

Second, if the counts are the same, the objects involved in the query and the objects involved in the captured query plan (also referred to as "captured objects") can form a plurality of object pairs, each comprising an object involved in the query and an associated captured object. For example, N objects involved in the query and N captured objects involved in the captured query plan can form N object pairs.

For each object pair, a comparison can be made to determine if the two objects have matching DB_NAME, SCHEMA_NAME, OBJECT_NAME, and OBJECT_TYPE. If the objects only involve a specific database with a specific schema, the comparison can be made only for OBJECT_NAME and OBJECT_TYPE. If any of the N object pairs find a mismatch (e.g., the OBJECT_TYPE of one object in the query is "table" but the OBJECT_TYPE of the captured object in the pair is "view"), then the captured query plan is deemed to involve a different set of objects, and the captured query plan cannot be reused. Otherwise, for each object pair comprising an object involved in the query and an associated captured object, an evaluation can be performed to assess if the captured object can be reused for the object involved in the query. The captured query plan can be deemed to be reusable only when all captured objects are determined to be reusable for the paired objects involved in the query.

Figure 6:
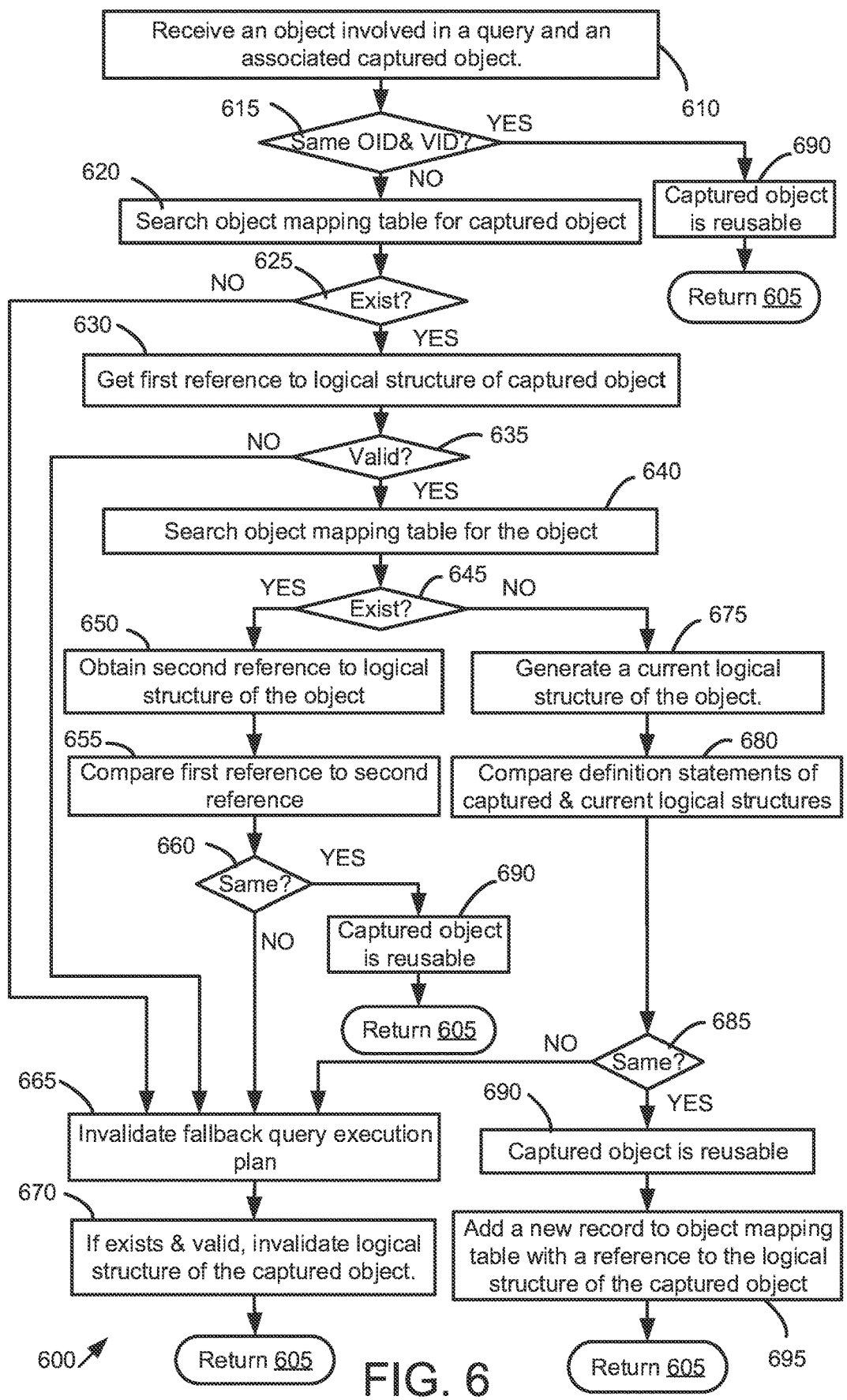
FIG. 6 is a flowchart illustrating an example method of assessing reusability of a captured plan object.

FIG. 6 is a flowchart illustrating an example method 600 of assessing reusability of a captured object involved in a query execution plan. In one example, the method 600 can be implemented by the object validation manager 164 depicted in FIG. 1.

At 610, the method 600 can receive an object pair including an object (hereinafter also referred to as "system object") involved in a query and an associated captured object.

At 615, the system object and the captured object can be compared to determine if they have the same OID and VID. If yes, it indicates the system object and the captured object are identical. Thus, the method 600 can branch to 690 to indicate that the captured object can be reused, and returns at 605 (and evaluates the next object pair, if any).

If the system object and the captured object have different OID and/or VID, the method 600 can proceed to 620 to search the object mapping table for the captured object. Specifically, the search can find if any of the records in the object mapping table contain the same DB_NAME, SCHEMA_NAME, OBJECT_NAME, OBJECT_TYPE, OID, and VID as the captured object. Comparison of DB_NAME and/or SCHEMA_NAME may be optional if such attributes are fixed, e.g., when a single database with a specific schema is involved.

At 625, if, for whatever reason, it is determined that the object mapping table does not have the captured object, the method 600 will proceed to 665 to invalidate the fallback query execution plan. Because no record in the object mapping table corresponds to the captured object, there is also no logical structure of the captured object in the object definition table. Thus, the step 670 can be skipped in this case, and the method 600 can return at 605.

On the other hand, responsive to finding the captured object in the object mapping table, the method 600 can proceed to 630 to get a first reference to a logical structure of the captured object. For example, if the object mapping table includes a record corresponding to the captured object, the first reference can be the DEFINITION_ID of that record. Based on the first reference, the logical structure of the captured object (also referred to as "captured logical structure" hereinafter) and its corresponding parameters (e.g., IS_VALID, DEFINITION_VERSION, etc.) can be retrieved. structure of the captured object can also be referred to as the "captured logical structure"

At 635, the validity of the logical structure of the captured object can be checked. If it is determined to be invalid (e.g., IS_VALID=False), then the method 600 can proceed to 665 to invalidate the fallback query execution plan. Because the logical structure of the captured object is already deemed invalid, the step 670 can be skipped in this case, and the method 600 can return at 605.

On the other hand, responsive to a determination that the logical structure of the captured object is valid (e.g., IS_VALID=True), the method 600 can proceed to 640 to search the object mapping table for the system object. Similarly, the search can find if any of the records in the object mapping table contain the same DB_NAME, SCHEMA_NAME, OBJECT_NAME, OBJECT_TYPE, OID, and VID as the system object. Comparison of DB_NAME and/or SCHEMA_NAME may be optional if such attributes are fixed, e.g., when a single database with a specific schema is involved.

At 645, if it is determined that the object mapping table contains the system object, the method 600 will proceed to 650 to obtain a second reference to the logical structure of the system object. For example, if the object mapping table has a record corresponding to the object, the second reference can be the DEFINITION_ID of that record. Based on the second reference, the logical structure of the system object can be retrieved.

Then, at 655, the first reference (to the logical structure of the captured object) can be compared with the second reference (to the logical structure of the system object). Notably, in this scenario, instead of comparing the logical structures (which may involve string comparisons, or other complex operations such as decoding if the logical structures are coded), the comparison of references can be much simpler and more efficient.

If it is determined at 660 that the first reference is the same as the second reference, it indicates the system object and the captured object have the same logical structure. Thus, the method 600 can branch to 690 to indicate that the captured object can be reused, and returns at 605 (and evaluates the next object pair, if any).

On the other hand, if it is determined at 660 that the first reference is different from the second reference, it indicates the system object and the captured object have different logical structures, i.e., the captured object cannot be reused. In such case, the method 600 can proceed to 665 to invalidate the fallback query execution plan. In addition, because the logical structure of the captured object exists in the object definition table and is still flagged as valid, such logical structure of the captured object will be invalidated at 670 (e.g., by changing its IS_VALID status to False). Then, the method 600 can return at 605.

Returning to the condition check at 645, if it is determined that the object mapping table does not include the system object, the method 600 can proceed to 675 to generate a current logical structure of the system object. Specifically, the current logical structure of the system object can be generated based on a definition statement of the system object using the "captured version" of the definition statement (e.g., DEFINITION_VERSION) associated with the captured object.

Then at 680, the definition statements for the captured logical structure and the current logical structure can be compared, e.g., via string comparison.

If it is determined at 685 that the definition statements for the captured logical structure and the current logical structure are different, it indicates the system object and the captured object have different logical structures, i.e., the captured object cannot be reused. In such case, the method 600 can proceed to 665 to invalidate the fallback query execution plan. In addition, because the logical structure of the captured object exists in the object definition table and is still flagged as valid, such logical structure of the captured object needs to be invalidated at 670 (e.g., by changing its IS_VALID status to False), and the method 600 can return at 605.

On the other hand, if it is determined at 685 that the definition statements for the captured logical structure and the current logical structure are the same, the method 600 can proceed to 690 to indicate the system object and the captured object have the same logical structure, i.e., the captured object can be reused.

Before returning at 605, the needs to perform another step at 695 to update the object mapping table. This is because the object mapping table currently does not include the system object (as determined by the condition check at 645). Thus, the method 600 can add a new record corresponding to the system object to the object mapping table so that the same object can be found in the object mapping table in further searches. The new records includes attributes of the system object and a reference to the logical structure of the captured object stored in the object definition table.

Notably, at 675, it is the captured version of definition statement (instead of the current version of definition statement) used to generate the current logical structure of the system object at this step. This is important because the definition statements for creating the same object can differ simply due to different versions of the definition statements, as described above. Thus, using the current version of definition statement may generate a different definition statement for the system object (than using the captured version of definition statement), thus causing the condition check at 685 to branch to 665 to invalidate the fallback query execution plan. This scenario would represent a wasted opportunity to reuse the captured object (and potentially the fallback query execution plan) because the system object and the captured object could have the same logical structure.

In the depicted example, comparison of logical structures at 680 is based on comparison of corresponding definition statements (e.g., via string comparison). In certain examples, logical structures of the captured object and system object can be expressed in binary values, hash values, or another format. In such cases, comparison of logical structures between the captured object and system object can be based on value comparison or the like (e.g., comparing hash values instead of string comparison).

Figure 7:
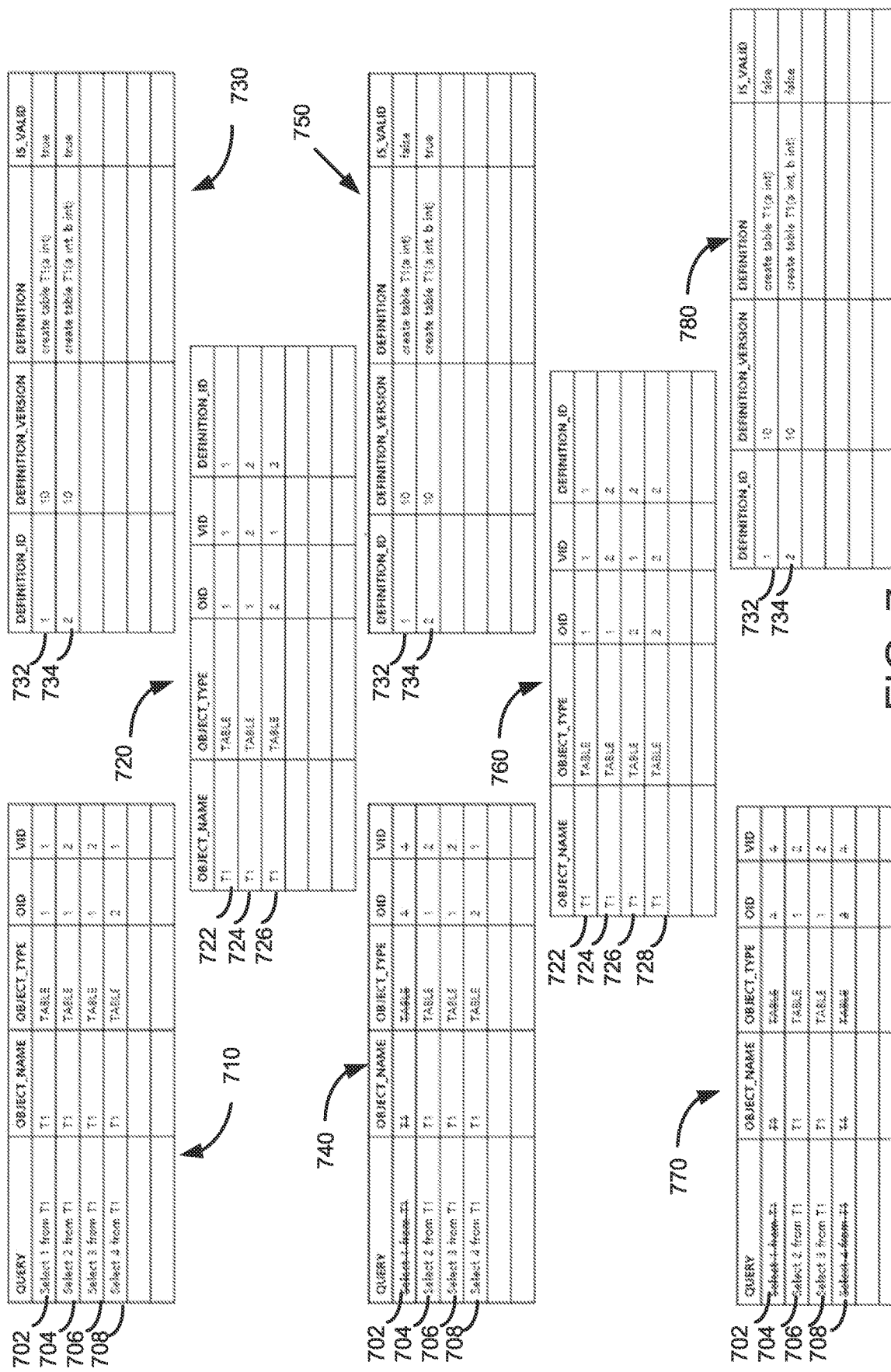
FIG. 7 depicts example captured query plans, as well as content changes in the object mapping table and object definition table of FIG. 5 when assessing reusability of captured plan objects in several use cases.

Example 8—Example Use Cases Illustrating Method of Assessing Reusability of Captured Plan Objects Five use cases are described herein with reference to FIG. 7 to further illustrate the method 600 of assessing reusability of a captured object involved in a query execution plan. In FIGS. 7, 710, 740, and 770 represent a capture query plan table storing metadata of captured query execution plans. Four captured query plans for four queries 702, 704, 706, and 708 are depicted in this example. FIG. 7 also shows an object mapping table (720, 760) and a corresponding object definition table (730, 750, and 780) at different stages corresponding to the use cases. For simplicity, certain attributes (e.g., DB_NAME and SCHEMA_NAME) in the object mapping tables are omitted (e.g., assuming the objects are in the same database and share the same schema), and some columns (e.g., TIMESTAMP) are also omitted from the object definition tables.

In a first use case, a request is received to reuse the captured query plan 708 for the query "Select 4 from T1." In this example, the system object involved in the query is Table T1, which has an OID=2 and a VID=1. The corresponding captured object is also Table T1, which has the same OID=2 and VID=1, according to the captured query plan 708 stored in 710. Thus, the condition check at 615 will find the system object and the captured object are identical, and confirm the reusability of the captured object.

In a second use case, a request is received to reuse the captured query plan 706 for the query "Select 3 from T1." In this example, the system object involved in the query is still Table T1, which has an OID=2 and a VID=1. The corresponding captured object is also Table T1, which has a different OID=1 and a different VID=2, according to the captured query plan 706 stored in 710.

Thus, the method 600 will proceed to 620 to search the object mapping table 720 and find the captured object in the second record 724. The record 724 contains the first reference (DEFINITION_ID=2), which is linked to second row 734 of the object definition table 730 that stores the logical structure of the captured object (represented by the DDL statement "create table T1(a int, b int)"). Because the logical structure of the captured object is valid (IS_VALID=true), the method 600 will proceed to 640 to search the object mapping table 720 and find the system object in record 726. The record 726 contains the second reference (DEFINITION_ID=2), which is determined (at 660) to be the same as the first reference. Thus, the captured object can be confirmed to be reusable.

In a third use case, a request is received to reuse the captured query plan 702 for the query "Select 1 from T1." In this example, the system object involved in the query is still Table T1, which has an OID=2 and a VID=1. The corresponding captured object is also Table T1, which has a different OID=1 but the same VID=1, according to the captured query plan 702 stored in 710.

Similarly, the method 600 will proceed to 620 to search the object mapping table 720 and find the captured object in the first record 722. The record 724 contains the first reference (DEFINITION_ID=1), which is linked to first row 732 of the object definition table 730 that stores the logical structure of the captured object (represented by the DDL statement "create table T1(a int)"). Because the logical structure of the captured object is valid (IS_VALID=true), the method 600 will proceed to 640 to search the object mapping table 720 and find the system object in record 726. The record 726 contains the second reference (DEFINITION_ID=2), which is determined (at 660) to be different from the first reference. Thus, the method 600 will proceed to 665 to invalidate the fallback query plan (as indicated by the strikethrough of record 702 in the updated table 740). In addition, the method 600 will invalidate the logical structure of the captured object in row 732 of the object definition table (now 750), by changing the IS_VALID status to false.

In a fourth use case, Table T1 has been truncated by a user using the DDL statement: "TRUNCATE T1." Then, a request is received to reuse the captured query plan 708 for the query "Select 4 from T1." In this example, the system object involved in the query is still Table T1, which has an OID=2 and a changed VID=2. The corresponding captured object is also Table T1, which has the same OID=2 and a different VID=1, according to the captured query plan 708 stored in 740.

Similarly, the method 600 will proceed to 620 to search the object mapping table 720 and find the captured object in the third record 726. The record 726 contains the first reference (DEFINITION_ID=2), which is linked to second row 734 of the object definition table 750 that stores the logical structure of the captured object (represented by the DDL statement "create table T1(a int, b int)"). Because the logical structure of the captured object is valid (IS_VALID=true), the method 600 will proceed to 640 to search the object mapping table 720 for the system object. In this case, no record in the object mapping table 720 corresponds to the system object. Thus, the method 600 will branch to 675 to generate a current logical structure of the system object using the captured version of the definition statement (DEFINITION_VERSION=10, according to row 734). In this example, the generated current logical structure of the system object is represented by the following DDL statement: "create table T1(a int, b int)." Because the definition statements for the captured logical structure and the current logical structure are the same (as determined at 685), the method 600 will confirm the captured object can be reused. In addition, at 695, the method 600 will add a new record 728 to the object mapping table (now becomes 760). The new record 728 includes attributes of the system object and a reference (DEFINITION_ID=2) to the second row 734 of the object definition table 750.

In a fifth use case, Table T1 has been altered by a user using the DDL statement: "ALTER table T1 add column (c int)." Then, a request is received to reuse the captured query plan 708 for the query "Select 4 from T1." In this example, the system object involved in the query is still Table T1, which has an OID=2 and a changed VID=3. The corresponding captured object is also Table T1, which has the same OID=2 and a different VID=1, according to the captured query plan 708 stored in 740.

Similarly, the method 600 will proceed to 620 to search the object mapping table 760 and find the captured object in the third record 726. The record 726 contains the first reference (DEFINITION_ID=2), which is linked to second row 734 of the object definition table 750 that stores the logical structure of the captured object (represented by the DDL statement "create table T1(a int, b int)"). Because the logical structure of the captured object is valid (IS_VALID=true), the method 600 will proceed to 640 to search the object mapping table 760 for the system object. In this case, no record in the object mapping table 760 corresponds to the system object. Thus, the method 600 will branch to 675 to generate a current logical structure of the system object using the captured version of the definition statement (DEFINITION_VERSION=10, according to row 734). In this example, the generated current logical structure of the system object is represented by the following DDL statement: "create table T1(a int, b int, c int)" (as Table T1 has been altered). Because the definition statements for the captured logical structure and the current logical structure are different (as determined at 685), the method 600 will proceed to 665 to invalidate the fallback query execution plan (as indicated by the strikethrough of record 708 in the updated table 770). In addition, the method 600 will invalidate the logical structure of the captured object in row 734 of the object definition table (now 780), by changing the IS_VALID status to false.

Example 9—Example Advantages

A number of advantages can be achieved via the technology described herein. As described above, a system upgrade and/or change of data in a DBMS can cause performance regression of some query plans. To improve query plan stability, the DBMS may attempt to reuse previously captured query plans. But to determine whether a previously captured query plan is reusable or not can be technically challenging. Previous metadata-based approach can invalidate or decline to reuse a captured query plan for a query even if all objects involved in the query have the same logical structures as the objects in the captured query plan—simply because one object involved in the query has changed OID and/or VID. This would lead to missed opportunities to mitigate performance regression of the query plan.

The technology described herein can more accurately assess reusability of the captured query plan of a query, thus improving the query plan stability. Even if objects involved in the query have been modified (e.g., the OIDs and/or VIDs have changed) since the last capture of the query plan, the technology described herein can still reuse the captured query plan so long as the logical structures of the objects remain unchanged. Improvement in accuracy achieved by the disclosed technology can be attributed to the evaluation and/or comparison of logical structures of the objects involved in the query and captured objects. Specifically, the logical structure of an object can be captured based on a definition statement (e.g., DDL statement) of the object. Thus, logical structures of the objects involved in the query and the captured objects can be reliably compared and reuse some captured query plans even if some related objects have changed OIDs and/or VIDs, e.g., due to database upgrade, application upgrade, database system migration, change from test to production system, etc.

Compared to the old technology which may improperly invalidate a captured query plan simply because an object involved in the query plan has a different OID and/or VID, the improved reusability assessment of the disclosed technology can extend the lifetime of captured query plans. The ability to reuse those captured (and still valid) query plans can improve operating efficiency and lead to faster query results compared to the old technology, which would have to regenerate a query plan if the previously captured query plan was improperly invalidated and deemed non-reusable.

The improved object validation technology disclosed herein is also highly efficient. For example, the logical structures of the captured objects are stored in an object definition table, which can be referenced by records stored in an object mapping table. Storing the captured objects in two separate by related tables (i.e., object mapping table and object definition table) can save the memory/storage space and improve the efficiency of object searching and object validation. For example, multiple captured objects having different attributes but sharing the same logical structure can be saved in a single row of the object definition table (instead of multiple entries), and referenced by multiple records of the captured objects in the object mapping table. As another example, when assessing reusability of a captured object, references to the logical structures (instead of the logical structures themselves) can be compared (e.g., at 655 in FIG. 6), thus improving the computation efficiency.

Importantly, the improved object validation technology described herein takes into account versioning of the definition statement. As described above, the definition statements used in a database system can evolve over time. As a result, different versions of definition statements can create objects having the same logical structure. In such scenario, despite having different definition statements between a system object and a captured object, the methods described herein can still correctly recognize that the system object and the captured object have an identical logical structure, thus improving the robustness of the object validation technology.

Example 10—Example Computing Systems

Figure 8:
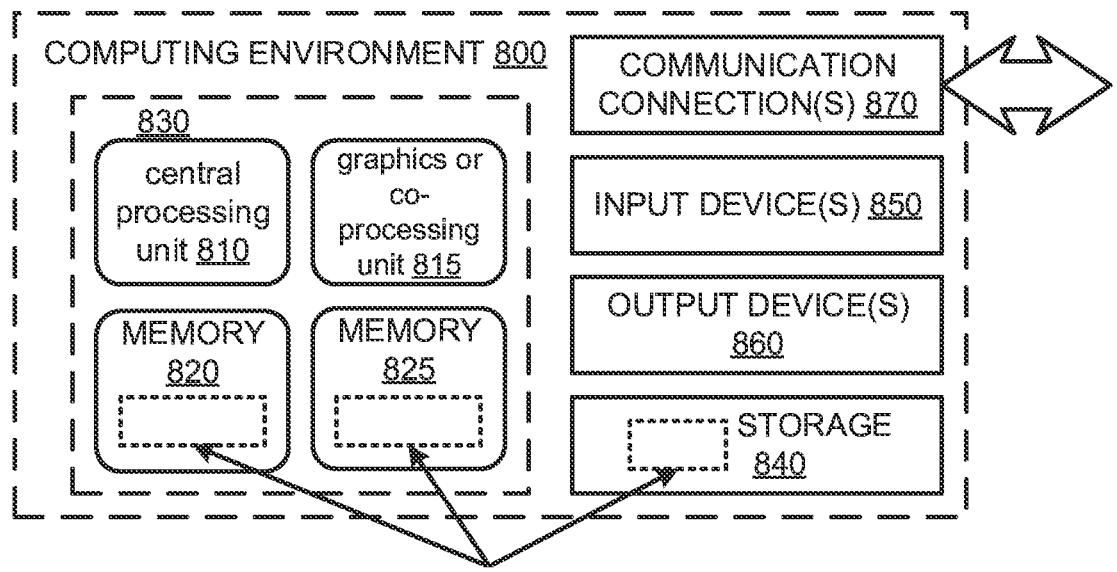
FIG. 8 is a block diagram of an example computing system in which described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 can execute computer-executable instructions, such as for implementing the features described in the examples herein (e.g., the methods 200, 400, and 600). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 can store software 880 implementing one or more innovations described herein, in the form of computer-executable instructions suitable for execution by the processing unit(s) 810, 815.

A computing system 800 can have additional features. For example, the computing system 800 can include storage 840, one or more input devices 850, one or more output devices 860, and one or more communication connections 870, including input devices, output devices, and communication connections for interacting with a user. An interconnection mechanism (not shown) such as a bus, controller, or network can interconnect the components of the computing system 800. Typically, operating system software (not shown) can provide an operating environment for other software executing in the computing system 800, and coordinate activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 can store instructions for the software 280 implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 11—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 12—Example Cloud Computing Environment

Figure 9:
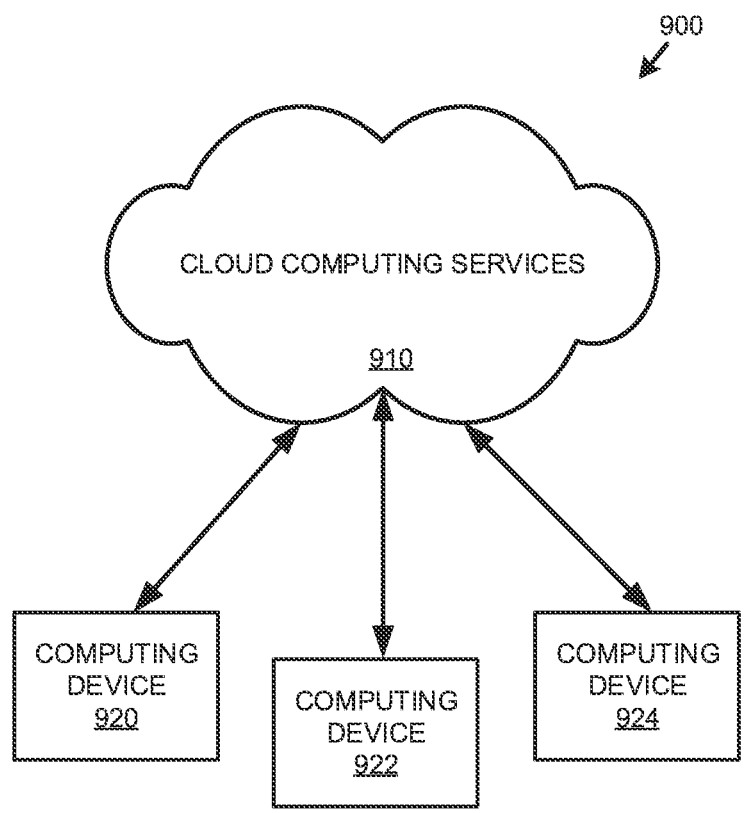
FIG. 9 is a block diagram of an example cloud computing environment that can be used in conjunction with the technologies described herein.

FIG. 9 depicts an example cloud computing environment 900 in which the described technologies can be implemented, including, e.g., the system 100 and other systems herein. The cloud computing environment 900 can include cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 can be utilized by various types of computing devices (e.g., client computing devices), such as computing devices 920, 922, and 923. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example 13—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 14—Example Embodiments

Any of the following embodiments can be implemented.

Embodiment 1. A computer-implemented method comprising: receiving a request for a fallback query execution plan of a query in a database system, wherein the query involves an object of the database system, wherein the object is associated with a captured object; evaluating whether the object and the captured object have the same logical structure; and responsive to an indication that the object and the captured object have the same logical structure, reusing the fallback query execution plan to execute the query, wherein the evaluating comprises: identifying a logical structure of the captured object stored in an object definition table; obtaining a current logical structure of the object; and comparing the logical structure of the captured object with the current logical structure of the object.

Embodiment 2. The method of embodiment 1, further comprising: receiving a captured query execution plan involving the object; determining whether the object definition table comprises a captured logical structure of the object; and responsive to determining that the object definition table does not comprise the captured logical structure of the object, generating the current logical structure of the object based on a definition statement of the object using a current version of the definition statement, storing the current logical structure of the object in the object definition table, and storing a first record of the object in an object mapping table, wherein the first record of the object comprises attributes of the object and a reference to the current logical structure of the object stored in the object definition table.

Embodiment 3. The method of embodiment 2, further comprising: responsive to determining that the object definition table comprises the captured logical structure of the object, generating a new logical structure of the object based on the definition statement of the object using a captured version of the definition statement; comparing the capture logical structure of the object to the new logical structure of the object; and responsive to determining that the captured logical structure of the object is different from the new logical structure of the object, generating the current logical structure of the object based on the definition statement of the object using the current version of the definition statement, storing the current logical structure of the object in the object definition table, and storing the record of the object in the object mapping table.

Embodiment 4. The method of embodiment 3, further comprising: responsive to determining that the current logical structure of the object is the same as the new logical structure of the object, storing a second record of the object in the object mapping table, wherein the second record of the object comprises attributes of the object and a reference to the captured logical structure of the object stored in the object definition table.

Embodiment 5. The method of any one of embodiments 1-4, wherein identifying the logical structure of the captured object comprises: searching an object mapping table to find a first reference to the logical structure of the captured object stored in the object definition table; checking validity of the logical structure of the captured object stored in the object definition table; and responsive to a determination that the logical structure of the captured object is invalid, invalidating the fallback query execution plan, wherein the logical structure of the captured object is based on a definition statement of the captured object using a captured version of the definition statement, wherein the object mapping table comprises one or more records containing attributes of one or more captured objects and references to logical structures of the one or more captured objects that are stored in the object definition table.

Embodiment 6. The method of embodiment 5, wherein obtaining the current logical structure of the object comprises: searching the object mapping table to find a second reference to the current logical structure of the object stored in the object definition table; and responsive to finding the second reference in the object mapping table, comparing the first reference to the second reference.

Embodiment 7. The method of embodiment 6, further comprising: responsive to a determination that the first reference is the same as the second reference, generating the indication that the object and the captured object have the same logical structure.

Embodiment 8. The method of any one of embodiments 6-7, further comprising: responsive to a determination that the first reference is different from the second reference, invalidating the fallback query execution plan, and invalidating the logical structure of the captured object stored in the object definition table.

Embodiment 9. The method of any one of embodiments 6-8, further comprising: responsive to not finding the second reference in the object mapping table, generating the current logical structure of the object based on a definition statement of the object using a captured version of the definition statement; and comparing the definition statement of the object to the definition statement of the captured object.

Embodiment 10. The method of embodiment 9, further comprising: responsive to a determination that the definition statement of the object is the same as the definition statement of the captured object, generating the indication that the object and the captured object have the same logical structure; and adding a new record to the object mapping table, wherein the new record comprises attributes of the object and a reference to the logical structure of the captured object stored in the object definition table.

Embodiment 11. The method of any one of embodiments 9-10, further comprising: responsive to a determination that the definition statement of the object is different from the definition statement of the captured object, invalidating the fallback query execution plan, and invalidating the logical structure of the captured object stored in the object definition table.

Embodiment 12. A computing system, comprising: memory; one or more hardware processors coupled to the memory; and one or more computer readable storage media storing instructions that, when loaded into the memory, cause the one or more hardware processors to perform operations comprising: receiving a request for a fallback query execution plan of a query in a database system, wherein the query involves an object of the database system, wherein the object is associated with a captured object; evaluating whether the object and the captured object have the same logical structure; and responsive to an indication that the object and the captured object have the same logical structure, reusing the fallback query execution plan to execute the query, wherein the evaluating comprises: identifying a logical structure of the captured object stored in an object definition table; obtaining a current logical structure of the object; and comparing the logical structure of the captured object with the current logical structure of the object.

Embodiment 13. The system of embodiment 12, wherein the operations further comprise: receiving a captured query execution plan involving the object; determining whether the object definition table comprises a captured logical structure of the object; and responsive to determining that the object definition table does not comprise the captured logical structure of the object, generating the current logical structure of the object based on a definition statement of the object using a current version of the definition statement, storing the current logical structure of the object in the object definition table, and storing a first record of the object in an object mapping table, wherein the first record of the object comprises attributes of the object and a reference to the current logical structure of the object stored in the object definition table.

Embodiment 14. The system of embodiment 13, wherein the operations further comprise: responsive to determining that the object definition table comprises the captured logical structure of the object, generating a new logical structure of the object based on the definition statement of the object using a captured version of the definition statement; comparing the capture logical structure of the object to the new logical structure of the object; responsive to determining that the captured logical structure of the object is different from the new logical structure of the object, generating the current logical structure of the object based on the definition statement of the object using the current version of the definition statement, storing the current logical structure of the object in the object definition table, and storing the record of the object in the object mapping table; and responsive to determining that the current logical structure of the object is the same as the new logical structure of the object, storing a second record of the object in the object mapping table, wherein the second record of the object comprises attributes of the object and a reference to the captured logical structure of the object stored in the object definition table.

Embodiment 15. The system of any one of embodiments 12-14, wherein identifying the logical structure of the captured object comprises: searching an object mapping table to find a first reference to the logical structure of the captured object stored in the object definition table; wherein the logical structure of the captured object is based on a definition statement of the captured object using a captured version of the definition statement; wherein the object mapping table comprises one or more records containing attributes of one or more captured objects and references to logical structures of the one or more captured objects that are stored in the object definition table; wherein obtaining the current logical structure of the object comprises searching the object mapping table to find a second reference to the current logical structure of the object stored in the object definition table.

Embodiment 16. The system of embodiment 15, wherein the operations further comprise: responsive to finding the second reference in the object mapping table, comparing the first reference to the second reference; responsive to a determination that the first reference is the same as the second reference, generating the indication that the object and the captured object have the same logical structure; and responsive to a determination that the first reference is different from the second reference, invalidating the fallback query execution plan, and invalidating the logical structure of the captured object stored in the object definition table.

Embodiment 17. The system of any one of embodiments 15-16, wherein the operations further comprise: responsive to not finding the second reference in the object mapping table, generating the current logical structure of the object based on a definition statement of the object using a captured version of the definition statement; and comparing the definition statement of the object to the definition statement of the captured object.

Embodiment 18. The system of embodiment 17, wherein the operations further comprise: responsive to a determination that the definition statement of the object is the same as the definition statement of the captured object, generating the indication that the object and the captured object have the same logical structure; and adding a new record to the object mapping table, wherein the new record comprises attributes of the object and a reference to the logical structure of the captured object stored in the object definition table.

Embodiment 19. The system of any one of embodiments 17-18, wherein the operations further comprise: responsive to a determination that the definition statement of the object is different from the definition statement of the captured object, invalidating the fallback query execution plan, and invalidating the logical structure of the captured object stored in the object definition table.

Embodiment 20. One or more non-transitory computer-readable media having encoded thereon computer-executable instructions causing one or more processors to perform a method comprising: receiving a request for a fallback query execution plan of a query in a database system, wherein the query involves a system table in the database system, wherein the system table is paired with a captured table; evaluating whether the system table and the captured table have the same logical structure; responsive to an indication that the system table and the captured table have the same logical structure, reusing the fallback query execution plan to execute the query; and responsive to an indication that the system table and the captured table have different logical structures, rejecting the request for the fallback query execution plan, wherein the evaluating comprises: identifying a logical structure of the captured table stored in an object definition table; obtaining a current logical structure of the system table; and comparing the logical structure of the captured table with the current logical structure of the system table, wherein identifying the logical structure of the captured table comprises searching an object mapping table to find a first reference to the logical structure of the captured table stored in the object definition table, wherein the object mapping table comprises one or more records containing attributes of one or more captured tables and references to logical structures of the one or more captured tables that are stored in the object definition table.

Example 15—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
receiving a request for a fallback query execution plan of a query in a database system, wherein the query involves an object of the database system, wherein the object is associated with a captured object;
evaluating whether the object and the captured object have the same logical structure; and
responsive to an indication that the object and the captured object have the same logical structure, reusing the fallback query execution plan to execute the query,
wherein the evaluating comprises:
identifying a logical structure of the captured object stored in an object definition table;
obtaining a current logical structure of the object; and
comparing the logical structure of the captured object with the current logical structure of the object,
wherein identifying the logical structure of the captured object comprises searching an object mapping table to find a first reference linked to the logical structure of the captured object stored in the object definition table,
wherein the logical structure of the captured object is based on a definition statement of the captured object using a captured version of the definition statement,
wherein the object definition table stores logical structures of one or more captured objects, wherein the object mapping table comprises one or more records containing attributes of the one or more captured objects and references to the logical structures of the one or more captured objects stored in the object definition table.

2. The method of claim 1, further comprising:
receiving a captured query execution plan involving the object;
determining whether the object definition table comprises a captured logical structure of the object; and
responsive to determining that the object definition table does not comprise the captured logical structure of the object, generating the current logical structure of the object based on a definition statement of the object using a current version of the definition statement, storing the current logical structure of the object in the object definition table, and storing a first record of the object in an object mapping table,
wherein the first record of the object comprises attributes of the object and a reference to the current logical structure of the object stored in the object definition table.

3. The method of claim 2, further comprising:
responsive to determining that the object definition table comprises the captured logical structure of the object, generating a new logical structure of the object based on the definition statement of the object using a captured version of the definition statement;
comparing the capture logical structure of the object to the new logical structure of the object; and
responsive to determining that the captured logical structure of the object is different from the new logical structure of the object, generating the current logical structure of the object based on the definition statement of the object using the current version of the definition statement, storing the current logical structure of the object in the object definition table, and storing the record of the object in the object mapping table.

4. The method of claim 3, further comprising:
responsive to determining that the current logical structure of the object is the same as the new logical structure of the object, storing a second record of the object in the object mapping table, wherein the second record of the object comprises attributes of the object and a reference to the captured logical structure of the object stored in the object definition table.

5. The method of claim 1, wherein identifying the logical structure of the captured object comprises:
checking a validity status of the logical structure of the captured object stored in the object definition table; and
responsive to a determination that the logical structure of the captured object is invalid, invalidating the fallback query execution plan.

6. The method of claim 1, wherein obtaining the current logical structure of the object comprises:
searching the object mapping table to find a second reference to the current logical structure of the object stored in the object definition table; and
responsive to finding the second reference in the object mapping table, comparing the first reference to the second reference.

7. The method of claim 6, further comprising:
responsive to a determination that the first reference is the same as the second reference, generating the indication that the object and the captured object have the same logical structure.

8. The method of claim 6, further comprising:
responsive to a determination that the first reference is different from the second reference, invalidating the fallback query execution plan, and invalidating the logical structure of the captured object stored in the object definition table.

9. The method of claim 6, further comprising:
responsive to not finding the second reference in the object mapping table, generating the current logical structure of the object based on a definition statement of the object using a captured version of the definition statement; and
comparing the definition statement of the object to the definition statement of the captured object.

10. The method of claim 9, further comprising:
responsive to a determination that the definition statement of the object is the same as the definition statement of the captured object, generating the indication that the object and the captured object have the same logical structure; and
adding a new record to the object mapping table, wherein the new record comprises attributes of the object and a reference to the logical structure of the captured object stored in the object definition table.

11. The method of claim 9, further comprising:
responsive to a determination that the definition statement of the object is different from the definition statement of the captured object, invalidating the fallback query execution plan, and invalidating the logical structure of the captured object stored in the object definition table.

12. A computing system, comprising:
memory;
one or more hardware processors coupled to the memory; and
one or more computer readable storage media storing instructions that, when loaded into the memory, cause the one or more hardware processors to perform operations comprising:
receiving a request for a fallback query execution plan of a query in a database system, wherein the query involves an object of the database system, wherein the object is associated with a captured object;
evaluating whether the object and the captured object have the same logical structure; and
responsive to an indication that the object and the captured object have the same logical structure, reusing the fallback query execution plan to execute the query,
wherein the evaluating comprises:
identifying a logical structure of the captured object stored in an object definition table;
obtaining a current logical structure of the object; and
comparing the logical structure of the captured object with the current logical structure of the object,
wherein identifying the logical structure of the captured object comprises searching an object mapping table to find a first reference linked to the logical structure of the captured object stored in the object definition table,
wherein the logical structure of the captured object is based on a definition statement of the captured object using a captured version of the definition statement,
wherein the object definition table stores logical structures of one or more captured objects, wherein the object mapping table comprises one or more records containing attributes of the one or more captured objects and references to the logical structures of the one or more captured objects stored in the object definition table.

13. The system of claim 12, wherein the operations further comprise:
receiving a captured query execution plan involving the object;
determining whether the object definition table comprises a captured logical structure of the object; and
responsive to determining that the object definition table does not comprise the captured logical structure of the object, generating the current logical structure of the object based on a definition statement of the object using a current version of the definition statement, storing the current logical structure of the object in the object definition table, and storing a first record of the object in an object mapping table,
wherein the first record of the object comprises attributes of the object and a reference to the current logical structure of the object stored in the object definition table.

14. The system of claim 13, wherein the operations further comprise:
responsive to determining that the object definition table comprises the captured logical structure of the object, generating a new logical structure of the object based on the definition statement of the object using a captured version of the definition statement;
comparing the capture logical structure of the object to the new logical structure of the object;
responsive to determining that the captured logical structure of the object is different from the new logical structure of the object, generating the current logical structure of the object based on the definition statement of the object using the current version of the definition statement, storing the current logical structure of the object in the object definition table, and storing the record of the object in the object mapping table; and
responsive to determining that the current logical structure of the object is the same as the new logical structure of the object, storing a second record of the object in the object mapping table, wherein the second record of the object comprises attributes of the object and a reference to the captured logical structure of the object stored in the object definition table.

15. The system of claim 12, wherein obtaining the current logical structure of the object comprises searching the object mapping table to find a second reference to the current logical structure of the object stored in the object definition table.

16. The system of claim 15, wherein the operations further comprise:
    responsive to finding the second reference in the object mapping table, comparing the first reference to the second reference;
    responsive to a determination that the first reference is the same as the second reference, generating the indication that the object and the captured object have the same logical structure; and
    responsive to a determination that the first reference is different from the second reference, invalidating the fallback query execution plan, and invalidating the logical structure of the captured object stored in the object definition table.

17. The system of claim 15, wherein the operations further comprise:
    responsive to not finding the second reference in the object mapping table, generating the current logical structure of the object based on a definition statement of the object using a captured version of the definition statement; and
    comparing the definition statement of the object to the definition statement of the captured object.

18. The system of claim 17, wherein the operations further comprise:
    responsive to a determination that the definition statement of the object is the same as the definition statement of the captured object, generating the indication that the object and the captured object have the same logical structure; and
    adding a new record to the object mapping table, wherein the new record comprises attributes of the object and a reference to the logical structure of the captured object stored in the object definition table.

19. The system of claim 17, wherein the operations further comprise:
    responsive to a determination that the definition statement of the object is different from the definition statement of the captured object, invalidating the fallback query execution plan, and invalidating the logical structure of the captured object stored in the object definition table.

20. One or more non-transitory computer-readable media having encoded thereon computer-executable instructions causing one or more processors to perform a method comprising:
    receiving a request for a fallback query execution plan of a query in a database system, wherein the query involves a system table in the database system, wherein the system table is paired with a captured table;
    evaluating whether the system table and the captured table have the same logical structure;
    responsive to an indication that the system table and the captured table have the same logical structure, reusing the fallback query execution plan to execute the query; and
    responsive to an indication that the system table and the captured table have different logical structures, rejecting the request for the fallback query execution plan,
    wherein the evaluating comprises:
        identifying a logical structure of the captured table stored in an object definition table;
        obtaining a current logical structure of the system table; and
        comparing the logical structure of the captured table with the current logical structure of the system table,
    wherein identifying the logical structure of the captured table comprises searching an object mapping table to find a first reference linked to the logical structure of the captured table stored in the object definition table,
    wherein the logical structure of the captured object is based on a definition statement of the captured object using a captured version of the definition statement,
    wherein the object definition table stores logical structures of one or more captured tables, wherein the object mapping table comprises one or more records containing attributes of the one or more captured tables and references to the logical structures of the one or more captured tables that are stored in the object definition table.

* * * * *